(12) United States Patent
Heiberg

(10) Patent No.: US 6,241,194 B1
(45) Date of Patent: Jun. 5, 2001

(54) MOMENTUM POSITION CONTROL

(75) Inventor: Christopher J. Heiberg, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/340,806

(22) Filed: Jun. 28, 1999

(51) Int. Cl.$^7$ ........................................ B64G 1/28
(52) U.S. Cl. ............................................ 244/165
(58) Field of Search ................................ 244/164, 165, 244/171, 170; 701/13

(56) References Cited

U.S. PATENT DOCUMENTS

| | | | |
|---|---|---|---|
| 3,741,500 | * | 6/1973 | Liden ................................... 244/165 |
| 5,597,143 | * | 1/1997 | Surauer et al. ........................ 244/164 |
| 5,906,338 | * | 5/1999 | Surauer et al. ........................ 244/165 |
| 6,047,927 | * | 4/2000 | Heiberg et al. ........................ 244/165 |
| 6,053,445 | * | 4/2000 | Price et al. ............................ 244/169 |
| 6,062,512 | * | 5/2000 | Wang et al. ........................... 244/165 |

OTHER PUBLICATIONS

*Ultrahigh–Accuracy Body–Pointing System for the Large Space Telescope,* J. Spacecraft, vol. 13, No. 4, p. 220, S. Calvin Rybak, et al.

AIAA Paper, No. 73–883, S. C. Rybak, et al., AIAA Guidance & Control Conference, Aug. 20–22, 1973.

AIAA Paper, No. 72–854, S. C. Rybak, et al., AIAA Guidance & Control Conference, Aug. 14–16, 1972.

* cited by examiner

Primary Examiner—Galen L. Barefoot
(74) Attorney, Agent, or Firm—Charles J. Ungemach; Robert E. Greenstien

(57) ABSTRACT

A vehicle control system is disclosed utilizing a reaction wheel assembly for producing small scanning motions and, in combination, a scissored pair of low-cost control moment gyros is used to produce larger slewing motions.

11 Claims, 2 Drawing Sheets

MOMENTUM POSITION CONTROL

BACKGROUND OF THE INVENTION

1. Field of the Invention

The present invention relates to position control of vehicles and more particularly to position control utilizing momentum devices such as control moment gyros, (CMGs) and reaction wheel assemblies (RWAs) which find major utility in the field of space satellites.

2. Description of the Prior Art

CMGs and RWAs have long been used to position and rotate space satellites through the use of angular momentum. CMGs operate to produce a relatively large torque along a first axis when a spinning mass is rotated with a smaller torque about a second axis, which process is often referred to as torque multiplication. RWAs include a spinning mass which exerts a relatively small torque along the spin axis as the mass is caused to spin faster or slower. Accordingly, combinations of CMGs (usually 3 or more in an array) are situated in non-coincidental mounting planes so that their torques may be applied, using various combinations, in any desired direction of rotation. Reaction wheel assemblies are similarly disposed with several (usually 3 or more in an array) reaction wheels aligned to cause rotation in any direction. CMGs are most commonly used where large and/or rapid motions, or high inertia equipment, needs to be moved with high precision such as in spacecraft slew maneuvers. RWAs are usually used where smaller movements are necessary, such as controlling the direction of scan of a sensor, or detector, such as small camera or radar antenna in satellites, which operate to view areas or targets on the earth. The large motions are referred to herein as "slewing" while the smaller motions are referred to herein as "scanning".

CMGs are extremely costly devices since their use normally requires great strength and precision and thus costly construction where high quality materials and sophisticated processes are involved. RWAs are considerable less costly since their design is much simpler and their uses are for smaller devices. There exists a need for a low cost device capable of rapidly rotating high inertia devices from one position to another as, for example, in a satellite which is used to scan targets on earth but which must move from one target area to another more quickly than is possible with an RWA array.

Additionally, because CMGs produce a large torque in an output axis given a small torque in the gimbal axis through torque multiplication, disturbances in the input torque also get amplified resulting in large disturbances in the output torque from the device. These disturbances can have a detrimental effect on the performance of the sensor or detector that the spacecraft is attempting to precision point during a scan. If the spacecraft inertia is sufficiently small, even the most precision CMGs can produce disturbances that will render the spacecraft unable to point the sensor within its required precision to properly operate. Conversely, RWA arrays produce relatively low disturbances when compared to CMGs making them better suited for scanning maneuvers.

Another device, referred to as a Scissored Pair of CMGs, exists which consists of two CMGs positioned with their spin axes in the same plane but which can be individually turned so as to gimbal about two parallel axes. Scissored Pair CMGs have been proposed for use in the backpacks of persons that are used in controlling their position during space walks. CMGs used in a scissored pair can exert multiplied disturbances to the host spacecraft similarly to CMG arrays.

BRIEF DESCRIPTION OF THE INVENTION

The present invention utilizes the concept of a scissored pair of CMGs, but manufactured with less precision and less expensive materials, and accordingly with much less cost, in combination with a RWA array. Precision three axis torque for scanning is obtained through the RWA array and high torque is available from the scissored pair when necessary to obtain low cost rapid slewing movement.

DETAILED DESCRIPTION OF THE PREFERRED EMBODIMENTS

Figure 1:
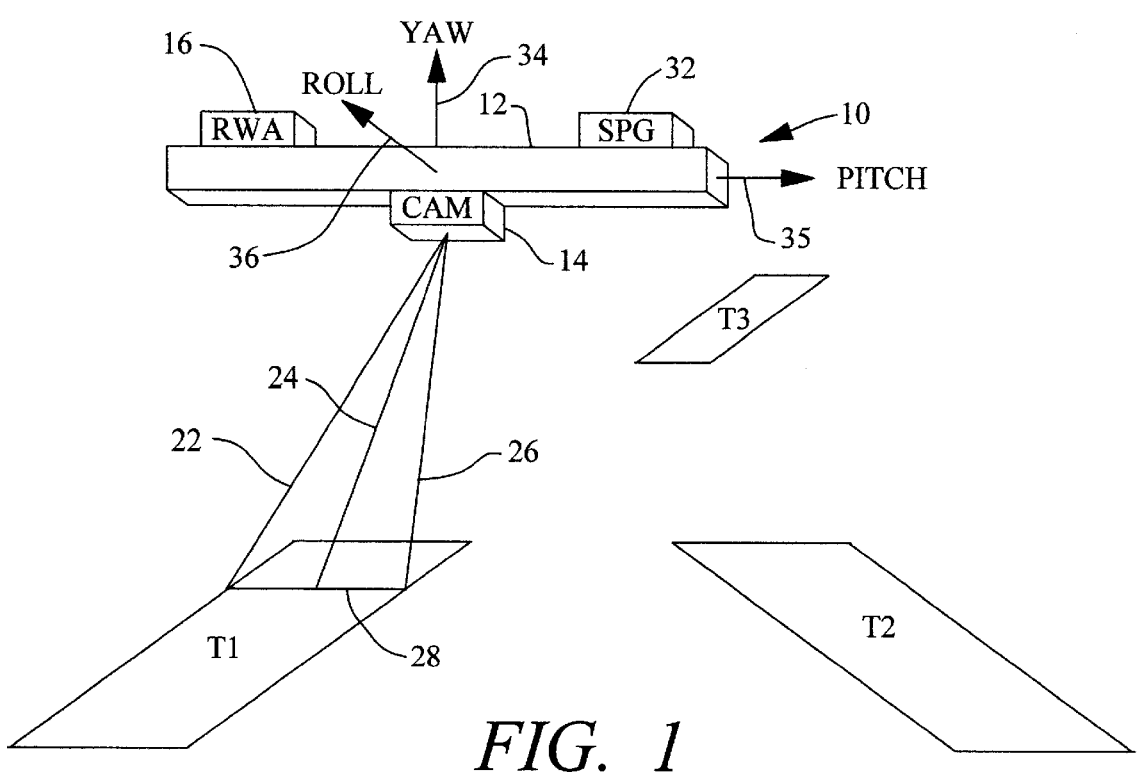
FIG. 1 is a showing of a space vehicle and a portion of earth being scanned.

In FIG. 1, a satellite 10 having a fairly large inertia mass shown as a flat plate 12 is shown housing a scanner 14 which may be a remote sensing device such as a camera, a radar antenna or a scientific platform that requires precision pointing. The mission of the satellite 10 and scanner 14 is to view selective portions or targets on earth such as is shown as area T1. An RWA array shown mounted on satellite 10 is operable to cause motion of scanner 14 as seen by ray lines 22, 24 and 26 to move back and forth along lines such as 28 on earth until the entire area T1 has been scanned.

Also shown in FIG. 1 is a second area, T2, which may have suddenly become important as a target so that the desire is to quickly move satellite 10 into a position where scanner 14 may view the area T2. A scissored pair of CMGs 32 are shown mounted on spacecraft 10 and these may be used to cause the more rapid and more powerful torque needed to position satellite 10 correctly. It should be noted that the yaw, pitch and roll axes of satellite 10 are shown by reference numerals 34, 35 and 36 respectively. The scissored pair of CMGs will have momentum vectors which, in one position, act in opposite directions so that no net momentum is imparted thereby. When the momentum vectors are moved to act in the same direction, the vectors add to produce a summed vector which operates to move satellite 10 around the roll axis in the present invention and quickly bring it into position to scan area T2. If the new target is in another direction, such as T3 in FIG. 1, then the satellite will be steered by first rotating the scissored pair of CMGs 32 together so that their oppositely directed momentum vectors remain oppositely directed until their momentum vectors are perpendicular to an eigen-axis in the roll-pitch plane. Thereafter, rotating the momentum vectors individually so that the vectors produce an additive momentum, as described above, will bring the sensor 14 to align to area T3. It should be noted that the scissored pair need not be mounted in the roll-pitch plane but can be mounted in the pitch-yaw plane, the roll- yaw plane or any eigen-plane as required by the mission. Also, it should be noted that, if needed, the torque supplied by the RWA array may be used during the slew to cancel some or all of the CMG induced disturbances, or even be added to that the torque from the scissored pair of CMGs to provide a little more speed and power for the slew. Similarly, if greater speed is desired for scanner 14, a momentum bias from the scissored pair of CMGs may be added to the output of the RWA array.

Figure 2:
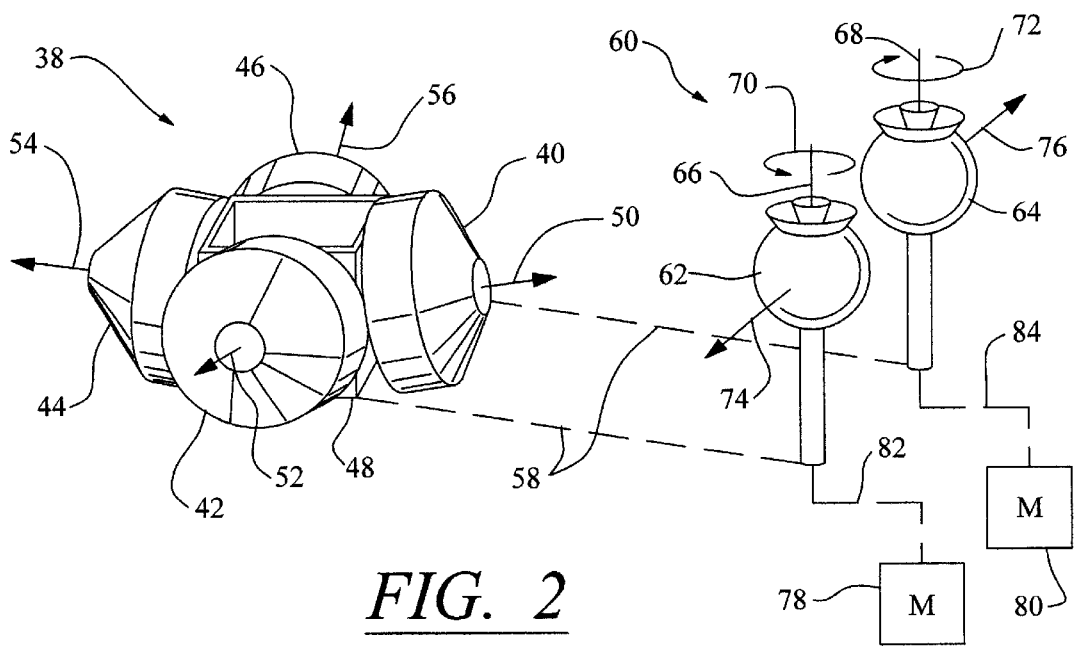
FIG. 2 is a showing of the combination of an RWA and a scissored Pair of CMGs according to the present invention; and, FIGS. 3a, 3b and 3c are showings of how the direction of torque varies with spin axis orientation in a scissored pair.

FIG. 2. shows an RWA array 38 comprising four individual reaction wheels mounted in four different directions around a mounting device shown as box 48. It is seen that reaction wheel 40 has a mass spinning about an axis 50, reaction wheel 42 has a mass spinning about an axis 52, reaction wheel 44 has a mass spinning about axis 54 and reaction wheel 46 has a mass spinning about an axis 56. Axes 50, 52, 24 and 56 are not in the same planes so that by proper control of the reaction wheels 40, 42, 44 and 46, motion of the scanner 14 of FIG. 1 can be accomplished in any direction. RWA array 38 is shown mounted on the satellite as indicated by dashed lines 58.

A scissored pair of CMGs 60 is also shown in FIG. 2 consisting of two individual CMGs 62 and 64 mounted for rotation about a parallel pair of axes 66 and 68 respectively. CMG 62 has a mass therein spinning about axis 74 while CMG 64 has a mass therein spinning about axis 76. As such, the momentum vectors, shown by arrows 74 and 76, which are exerted thereby, act in opposite directions. CMGs 62 and 64 are mounted so that their spin axes 66 and 68 can rotate in either direction in a plane perpendicular to the dashed lines 58. This may be accomplished by suitable motive means, such as motors 78 and 80 connected to the CMGs 62 and 64 by drives shown as dashed lines 82 and 84. As such, the momentum vectors 74 and 76 can be made to add in the same direction as is better seen in FIG. 3.

Figure 3A:
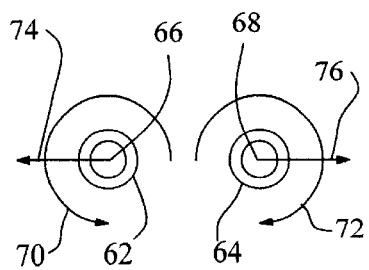
Figure 3B:
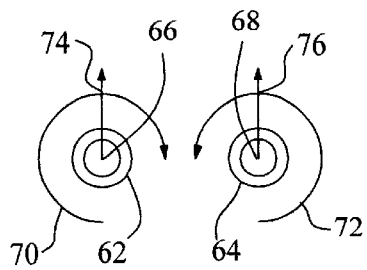
Figure 3C:
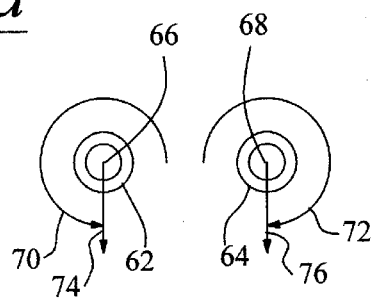

In FIG. 3a, the CMGs 62 and 64 are shown, as viewed along an axis perpendicular to the planes of rotation arrows 70 and 72. It is seen that the momentum vectors 74 and 76 are in the opposite direction to each other thereby canceling to produce no net momentum. In FIG. 3b, the spin axes 66 and 69 have been rotated 90 degrees so that both have their momentum vectors 74 and 76 pointing upward. In this condition the vectors add so that the summed momentum is upward. In FIG. 3c, the spin axes 66 and 69 have been rotated 90 degrees in the opposite direction so that both have their momentum vectors pointing down. In this condition, the vectors add so that the summed momentum vectors is downward. Of course, rotation of the spin axes 66 and 68 can be anywhere between 0 degrees as in FIG. 3a and plus or minus 90 degrees as in FIGS. 3b and 3c with the result that the momentum vectors will add to provide momentum in any direction within the plane of rotation. In this respect, the scissored pair CMGs differ from normal CMG arrays which can produce momentum vectors in any three-dimensional direction. As mentioned above, using the scissored pair for rotation about a single axis is acceptable because other directions will be handled by the other available steering apparatus of the satellite. In other words, the single plane is all that is necessary for slewing the satellite 12 in the application of the present invention. The CMGs 62 and 64 could just as well be standard gyroscopes; however, the presence of the RWA array for the precision torque during scanning allows a CMG with a lower quality disturbance output, and thereby lower cost.

The advantages of the cheaper CMGs, beside cost, is that while a three-axis CMG control typically requires slip rings or similar devices to bring the electrical signals into and out of the CMGs rotating gimbal, the scissored pair CMG in the present invention may merely have cables or limited displacement signal transfer assemblies to pass the signals, resulting in a simpler device with improved reliability. The torque quality of the expensive CMG is necessarily high, while is possible for the present CMGs to possess a lower quality or 'crude' torque to achieve both the slew and scan missions. Furthermore, in the typical satellite control, three CMGs are required as a minimum for control while in the present invention only two are needed. The fact that the scissored pair of CMGs are utilized in combination with a reaction wheel array makes the use of the less costly CMGs and their reduced number possible.

It is therefore seen that I have provided a control system which can operate in scan mode and then switch to a more rapid slew mode with less disturbance than heretofore possible. I have accomplished this with equipment that is less costly and simpler to employ than prior art systems. Many obvious modifications will occur to those having ordinary skill in the art, for example, using tilt table mounted RWAs instead of CMGs and employing the combination of RWAs and scissored pairs in environments other than space and for other than slew and scan purposes. Furthermore, although two CMGs have been shown as a scissored pair, there may be two or more scissored pairs and all of their momentum vectors can be made to add thereby doubling, tripling etc., the output. Even three or other odd numbers of CMGs may be used as long as they can be arranged so that their momentum vectors null out in one position and add in others. a "Y" shaped arrangement of three CMGs with 120 degrees between the arms would produce a null situation and then changing the angles would produce a summed situation with a maximum momentum of three times the individual CMG momentum. Accordingly, I do not wish to be limited to the specific structures and methods used to describe the preferred embodiment but to have the claims provide the scope of the invention.

What is claim is:

1. A control system for a vehicle comprising:
    a reaction wheel array operable to provide a limited scanning motion for the vehicle on a plurality of planes; and
    a scissored pair of control moment gyros each having a spin axis limited to a single plane and an angular momentum; and
    means to rotate the spin axes of the scissored pair to cause the momentum vectors to change direction and act in opposite directions, the same direction and directions therebetween according to the amount of rotation of the spin axes to slew the vehicle.

2. Apparatus according to claim 1 wherein the scissored pair is used to create a large torque to achieve a rapid slew reorientation of the vehicle between scans.

3. Apparatus according to claim 2 wherein the scanning motion produce by the reaction wheel array is assisted by the momentum produced by the scissored pair.

4. Apparatus according to claim 2 wherein the scissored pair produces a disturbance and the reaction wheel assembly is used to mitigate the disturbance.

5. Where the number of CMGs in a scissored pair is more than 1 and are used in conjunction to produce torque and momentum in a plane.

6. Apparatus according to claim 1 where in the vehicle is a satellite and the scanning motion is for observing terrestrial targets.

7. Apparatus according to claim 6 wherein the scanning motion for the satellite is produced for use by a radar antenna.

8. A control system for a vehicle comprising:
    a reaction wheel array operable to provide a limited scanning motion for the vehicle on a plurality of planes; and
    a scissored pair of control moment gyros each having a spin axis and an angular momentum, momentum vectors of said gyros lying substantially in a plane; and means to rotate the spin axes of the scissored pair to cause the momentum vectors to change direction and act in opposite directions, the same direction and directions therebetween according to the amount of rotation of the sp,in axes to slew the vehicle;

wherein the momentum vectors of the scissored pair lie substantially in a plane.

9. The method of controlling a satellite and a scanning device thereon comprising the steps of:

A. causing a scanning motion of the scanning device by use of a reaction wheel assembly; and B. causing a slewing motion of the satellite in one plane by use of at least one scissored pair of control moment gyros.

10. The method of claim 9 including the step of:

C. using at least one scissored pair of control moment gyros to assist the reaction wheel assembly produce the scanning motion.

11. The method of claim 9 including the step of:

C. using the reaction wheel assembly to mitigate any disturbance produced by at least one scissored pair.

* * * * *